US008838954B2

(12) United States Patent
Tian et al.

(10) Patent No.: US 8,838,954 B2
(45) Date of Patent: Sep. 16, 2014

(54) MEDIA PROCESSING DEVICES FOR ADAPTIVE DELIVERY OF ON-DEMAND MEDIA, AND METHODS THEREOF

(75) Inventors: Jun Tian, Belle Mead, NJ (US); Hong Heather Yu, West Windsor, NJ (US); Hongbing Li, Belle Mead, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 331 days.

(21) Appl. No.: 13/016,721

(22) Filed: Jan. 28, 2011

(65) Prior Publication Data

US 2011/0191577 A1   Aug. 4, 2011

Related U.S. Application Data

(60) Provisional application No. 61/300,788, filed on Feb. 2, 2010.

(51) Int. Cl.
*H04L 9/32* (2006.01)
*H04L 9/00* (2006.01)

(52) U.S. Cl.
CPC ........................................ *H04L 9/00* (2013.01)
USPC ......................................................... 713/150

(58) Field of Classification Search
USPC ................................................. 348/383–495
See application file for complete search history.

(56) References Cited

U.S. PATENT DOCUMENTS

| | | | |
|---|---|---|---|
| 6,851,063 B1 * | 2/2005 | Boyle et al. ................... | 380/268 |
| 7,024,393 B1 | 4/2006 | Peinado et al. | |
| 7,231,516 B1 * | 6/2007 | Sparrell et al. ................ | 713/156 |
| 7,242,776 B1 * | 7/2007 | Elliot ............................ | 380/278 |
| 2005/0166068 A1 * | 7/2005 | Lemma et al. ................ | 713/194 |
| 2005/0182855 A1 * | 8/2005 | Apostolopoulos et al. ... | 709/247 |
| 2005/0185793 A1 * | 8/2005 | LeComte et al. .............. | 380/33 |
| 2006/0117379 A1 * | 6/2006 | Bennett et al. .................... | 726/3 |
| 2006/0294128 A1 * | 12/2006 | Gottschalk .................... | 707/101 |
| 2008/0034276 A1 * | 2/2008 | Ficco ............................ | 715/201 |
| 2008/0043832 A1 * | 2/2008 | Barkley et al. ................ | 375/240 |
| 2009/0132823 A1 * | 5/2009 | Grimen et al. ................ | 713/171 |
| 2009/0297123 A1 * | 12/2009 | Virdi et al. ...................... | 386/69 |
| 2010/0100640 A1 * | 4/2010 | Nakao ........................... | 709/246 |
| 2010/0315549 A1 * | 12/2010 | Basso et al. ................... | 348/445 |
| 2011/0058675 A1 * | 3/2011 | Brueck et al. ................. | 380/277 |
| 2011/0106964 A1 * | 5/2011 | Bennett et al. ................ | 709/231 |

OTHER PUBLICATIONS

Wenjun Zeng et al., Efficient frequency domain selective scrambling of digital video, Mar. 2003, IEEE Transactions on Multimedia, vol. 5 Issue: 1, pp. 118-129.*

(Continued)

*Primary Examiner* — Farid Homayounmehr
*Assistant Examiner* — Olanrewaju Bucknor
(74) *Attorney, Agent, or Firm* — Slater & Matsil, L.L.P.

(57) ABSTRACT

In one embodiment, a method of streaming media includes partitioning a media stream to be transmitted into a first stream of media segments at a media server. The first stream of the media segments has a first sequence. An index table is generated to identify the first sequence of the first stream of the media segments. The index table is encrypted using a key. A second stream of the media segments is generated. The second stream has a second sequence, which is random relative to the first sequence. The encrypted index table and a transcoded media stream having the second stream of the media segments are transmitted.

23 Claims, 13 Drawing Sheets

(56) References Cited

OTHER PUBLICATIONS

Jiangtao Wen et al., A format-compliant configurable encryption framework for access control of video, Jun. 2002, IEEE Transactions on Circuits and Systems for Video Technology, vol. 12 Issue: 6, pp. 545-557.*

Cheng, H., et al., "Partial Encryption of Compressed Images and Videos," IEEE Transactions on Signal Processing, vol. 48, No. 8, Aug. 2000, pp. 2439-2451.

Johnson, M., et al., "On Compressing Encrypted Data," IEEE Transactions on Signal Processing, vol. 52, No. 10, Oct. 2004, pp. 2992-3006.

Xie, D., et al., "Multimedia Encryption with Joint Randomized Entropy Coding and Rotation in Partitioned Bitstream," Research Article, EURASIP Journal on Information Security, vol. 2007, Article ID 35262, 18 pages, Hindawi Publishing Corporation, Sep. 2007.

* cited by examiner

301: $M_1, M_2, M_3, \ldots, M_r, \ldots, M_{r+7}, M_{n-3}, M_{n-1}, M_n$

FIG. 3B

302: $M_{r-2}, M_{n-6}, M_{20}, \ldots, M_1, \ldots, M_{21}, M_{r-1}, M_6, M_{r+11}$

FIG. 3C

303: $M_{r-2}, M_{n-6}, A_1, M_{20}, \ldots, M_1, \ldots, A_2, M_{21}, M_{r-1}$

FIG. 3D

MEDIA PROCESSING DEVICES FOR ADAPTIVE DELIVERY OF ON-DEMAND MEDIA, AND METHODS THEREOF

This application claims the benefit of U.S. Provisional Application No. 61/300,788, filed on Feb. 2, 2010, entitled "Content Protection for Adaptive Delivery of VoD Media Content," which application is hereby incorporated herein by reference.

TECHNICAL FIELD

The present invention relates generally to media processing, and more particularly to media processing devices and methods for adaptive delivery of on-demand media.

BACKGROUND

The use of on-demand media has been increasing dramatically. Media on demand is served to a client device from a server device. The original digital media may consume large amounts of storage and transmission capacity. Consequently, the digital media is compressed and may be down converted to a lower resolution file. Accordingly, digital media is encoded and compressed to minimize the use of resources when the media is transmitted to client devices. Further, in selecting the optimal encoding and compression algorithms, the attributes of the client device may be taken into consideration.

Due to licensing requirements digital media must also be encrypted to avoid third parties from accessing the content. The user requesting the digital media may have only limited rights to the media. Therefore, digital media must also be encrypted before transmission.

Conventionally, encryption and compression processes are performed independently, each requiring significant computational resources. This problem is accentuated during adaptive streaming when a user may request additional media processing. Similarly at the receiving side, the decryption and decompression performed adaptively can consume significant resources. These problems can result in temporary pausing or disruption of the media stream impeding the user's experience of the media.

SUMMARY OF THE INVENTION

These and other problems are generally solved or circumvented, and technical advantages are generally achieved, by illustrative embodiments of the present invention.

In accordance with an embodiment of the present invention, a method of streaming media comprises partitioning a media stream to be transmitted into a first stream of media segments at a media server. The first stream of the media segments has a first sequence. An index table is generated to identify the first sequence of the first stream of the media segments. The index table is encrypted using a key. A second stream of the media segments is generated. The second stream has a second sequence, which is random relative to the first sequence. The encrypted index table and a transcoded media stream comprising the second stream of the media segments are transmitted.

In accordance with another embodiment of the present invention, a method of adaptive media streaming comprises receiving randomized media segments at a media device, and receiving an encrypted index table at the media device. The randomized media segments are compliant with a media compression standard. The method further includes generating an index table by decrypting the encrypted index table at the media device, and generating an ordered media segments from the randomized media segments using the index table. The index table has sequence information of the media segments.

In accordance with another embodiment of the present invention, a media server comprises a partitioner, an index table generator, an index table encryptor, a randomizer, and a transmitter. The partitioner is configured to partition a media stream to be transmitted into a first stream of media segments. The first stream of the media segments has a first sequence. The index table generator is configured to generate an index table identifying the first sequence of the first stream of the media segments. The index table encryptor is configured to encrypt the index table using a key. The randomizer is configured to generate a second stream of the media segments having a second sequence, which is random relative to the first sequence. The transmitter is configured to transmit the encrypted index table and a transmit media stream comprising the second stream of the media segments.

In accordance with another embodiment of the present invention, a media device comprises a receiver, an index table generator, and a derandomizer. The receiver is configured to receive randomized media segments. The randomized media segments are compliant with a media compression standard. The receiver is further configured to receive an encrypted index table. The index table generator is configured to generate an index table by decrypting the encrypted index table. The index table has sequence information of the media segments. The derandomizer is configured to generate an ordered media segments from the randomized media segments using the index table.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1, which includes

FIG. 3, which includes FIGS. 3A-3D, illustrates operations at a media server in accordance with an embodiment of the invention, wherein FIG. 3A illustrates an operational flow diagram, and wherein FIGS. 3B-3D illustrate a media stream during the operational flow;

FIG. 4, which includes

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
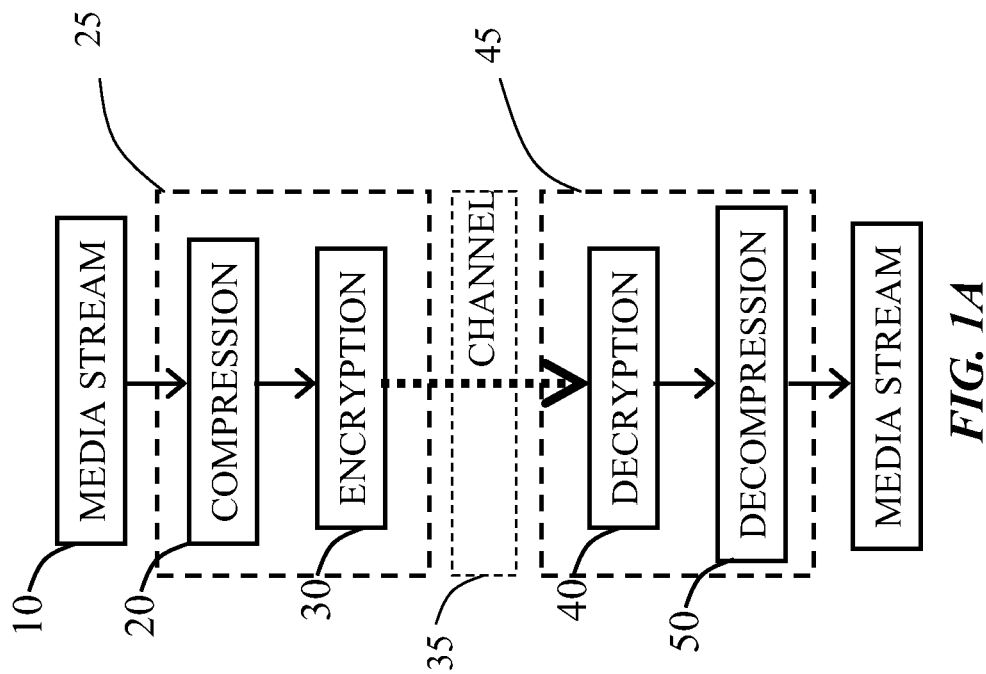
FIGS. 1A and 1B, illustrates a prior art approach to media communication.
Figure 1B:
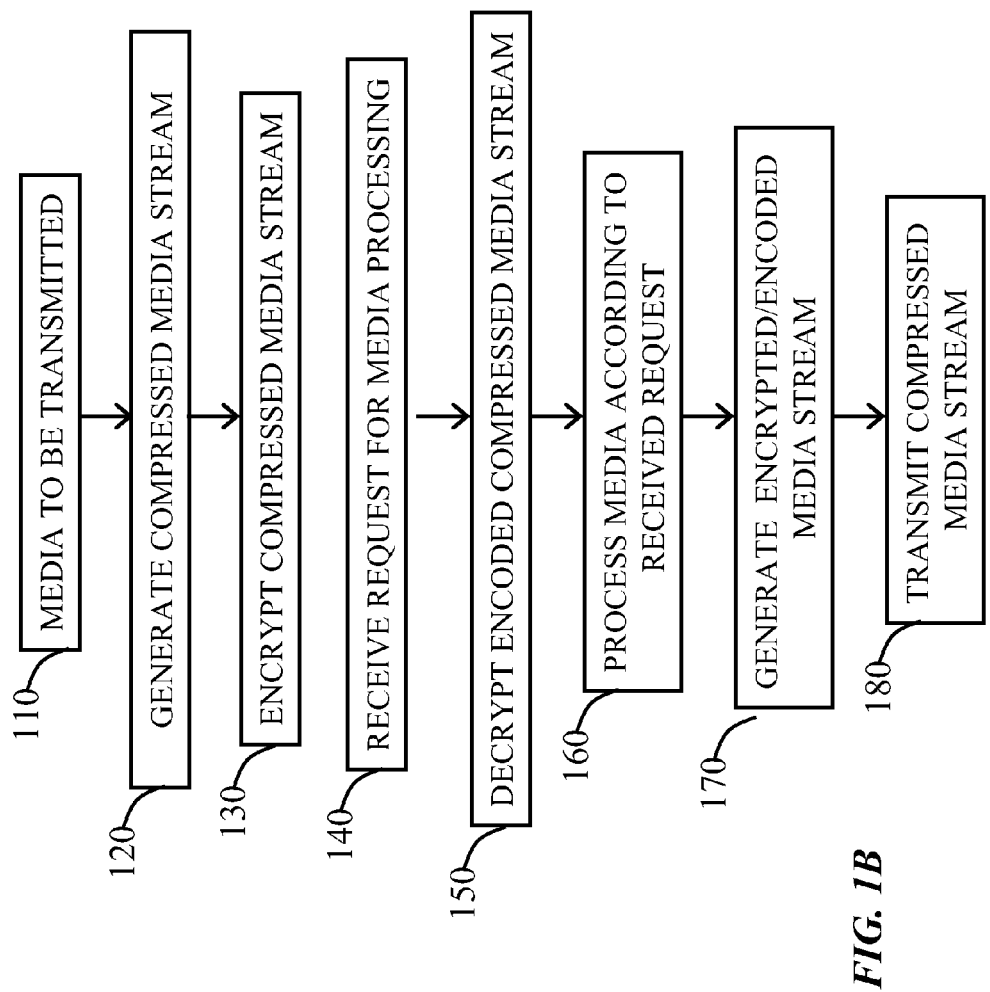

FIG. 1, which includes FIGS. 1A and 1B, illustrates a prior art approach to media communication during adaptive streaming.

FIG. 1A illustrates a media server 25 transporting a media stream to a media device 45 (client device). The media server 25 may be a network server, a local computer, or any suitable device that is connected to the media device 45 through a wireless or wired connection. The media server 25 may be a server located in the internet.

Because of the large band width required for communication, the media stream 10 is compressed (step 20). Further, in adaptive streaming, the media server 25 selects a compression based on the network connection and attributes of the device requesting the media. Next, encryption may be performed (step 30) to prevent third parties from accessing the transmitted media stream. The encrypted and compressed media stream is transmitted through a channel 35, which may include both wired and wireless connections, to the media device 45. At the media device 45, the encrypted media stream is decrypted (step 40) and decompressed (step 50) to recover the media stream.

The communication approach described above suffers from efficiency problems during adaptive streaming when a user requests further media operations. For example, if the media device 45 requests the media server 25 to transmit the media stream after a fast-forward or rewind operation, the media server 25 may be required to perform significant processing as described in FIG. 1B.

FIG. 1B illustrates operations at a transmitter or serving gateway under a prior art media processing scheme in which a user at a media device requests further media processing.

When a media device serving a user requests media from the media server, the requested media is processed (step 110) depending on the network connection and/or configuration of the media device. The media to be transmitted is recovered, for example, from another networked computer directly or indirectly coupled with the media server. The media may also be stored in a storage medium from which it is recovered, for example, at the beginning of the session with the media device.

The processing of the media includes compression to minimize band width (step 120) and encryption to avoid unlicensed users from accessing the content (step 130). The compressing media may be transmitted to the requesting media device. However, these processes may be interrupted when a user requests the media server to perform media processing. For example, the user may request to fast forward, rewind, change frame rate etc during the transmission.

Upon receipt of a user request (step 140), the media server decrypts the media stream (step 150) that was being transmitted so that it can perform the media processing. The decryption is required because conventional encryption while providing strong protection is not dependent on the data type. Therefore, irrespective of the data format being encrypted the encrypted media is not compatible with any media format i.e. not compliant with any media compression standards. Therefore, media operations can not be performed on the encrypted media.

After decryption, the unencrypted media stream is processed according to the received request (step 160). Before commencing transmission again, the unencrypted media has to be encrypted again (step 170). This compressed media stream (step 180) is transmitted to the media device. This pipelined process is very inefficient as it requires an additional encryption and decryption process (steps 150 and 170).

While not illustrated separately, the same problem may be present on the media device side. For example, the media device receiving the media stream may save the media into a local memory. Because of licensing requirements, the media device may be allowed to store the files only in the encrypted format. If the user requests media processing, the media device has to decrypt and encrypt all of the stored media stream. For example, if the user fast forwards to the last few frames of a large movie, the media device has to unencrypt the whole media stream to locate the final few frames. Then the media device has to encrypt this large file so as to store the file. This can be very computationally expensive especially on media devices that typically do not have significant computational power and/or memory. Embodiments of the invention overcome these and other problems by incorporating a content protection process that randomizes the media stream as described further below.

The framework of an adaptive streaming process used at a media server and a media device will be described using FIG. 2. Embodiments of the invention relating to a transmitting media server will be described using FIGS. 3-6. Embodiments of the invention relating to a receiving media device (client device) will be described using FIGS. 7-10.

Figure 2:
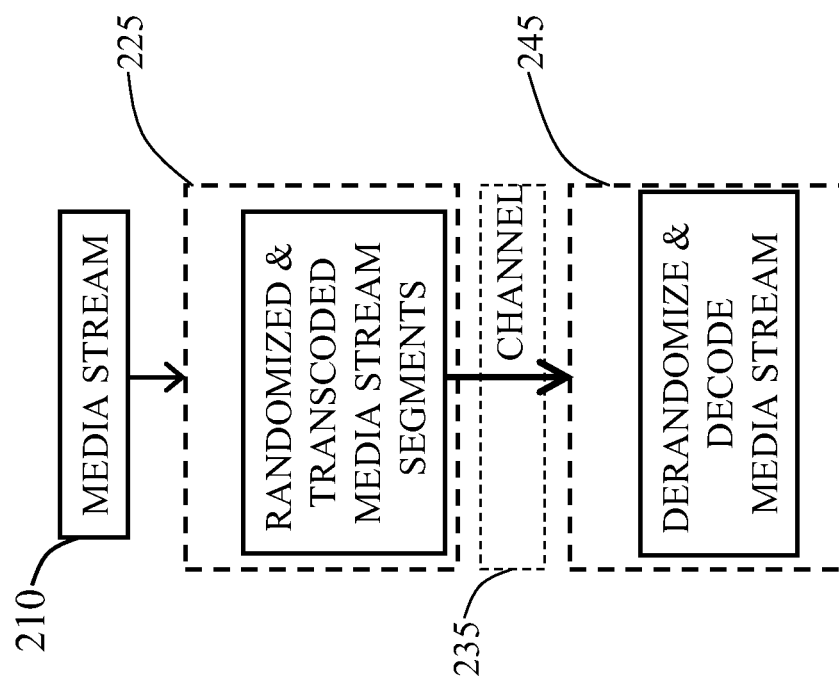
FIG. 2 illustrates an adaptive streaming process in accordance with an embodiment of the invention.

FIG. 2 illustrates a process for adaptive media delivery in accordance with an embodiment of the invention.

The embodiments of the invention described herein use transcoding at a media server 225. Transcoding is used to customize the media being transmitted to the media device. Transcoding includes changing media format, compression schemes, encoding schemes etc. For example, in transcoding, the compression algorithm may be selected based on the media device being served. This allows the media server to efficiently lower the band width based on the capabilities of the media device. For example, a lossy compression may be used wherein only a lower quality of the original media stream can be recovered at the media device. This may be advantageous when the media device does not have the capability to use the additional information in the original media stream. Further, in many cases, the media device may be incapable of processing higher resolution files. Therefore, sending the additional information in the original media stream may take up valuable band width without being utilized at the user end.

Consequently, in transcoding, knowledge of the application is used to choose information to discard, thereby lowering its bandwidth. The remaining information can then be compressed via a variety of methods. When the output is decoded, the resulting output may not be identical to the original input, but close enough for the purpose of the application.

In various embodiments, at the media server 225, the media stream 210 is segmented and transcoded and transmitted over a channel 235 in a random order. Randomizing the sequence of the media stream encrypts the transmitted media stream preventing unlicensed third parties from following the content of the media stream although they may be able to play the media stream because the media segments are scrambled.

This randomized and transcoded media stream is transmitted wirelessly and/or through wired communication to a media device 245. Advantageously, the described embodiments leverage the efficiency of transcoding algorithms that have been optimized for the media. The encryption is achieved by randomization of the media stream, which is a low complexity process, and therefore does not significantly alter the computational requirements. However, excellent security can be achieved despite the low complexity of the process. This is possible because of the similarity between compression and encryption. In general, both compression and encryption processes remove redundancy. In particular, compressed media stream has very little redundancy as compared to regular media that is encrypted. Embodiments of the invention exploit this similarity between encryption and compression.

In encryption, a media file, e.g., a plain text having a certain structure and semantics is transformed to a ciphertext that is statistically random with no apparent structure. During encryption, the structure of the input file is completely scrambled without redundancy so that the output appears to be random data. Therefore, encryption hides the redundancy to produce a random output that is almost free of redundancy.

A compression process, used during transcoding, is conceptually similar to encryption. During compression, raw multimedia files that may have a lot of redundancy are converted to an output having almost no redundancy. A key difference between encryption and compression is that operations in encryption are controlled by a secret key so that it is impossible to decrypt without knowing the key. In contrast, in compression, all operations are performed according to agreed standards, which allow the raw content to be decoded from the compressed media stream.

Embodiments of the invention leverage the compression algorithms which already have performed the heavy computational work to remove redundancy from the input data. Encryption is achieved by merely rearranging the compressed media along the time axis.

Further, advantageously, the media format of the compressed media stream is retained allowing media processing of the encrypted media stream.

Figure 3A:
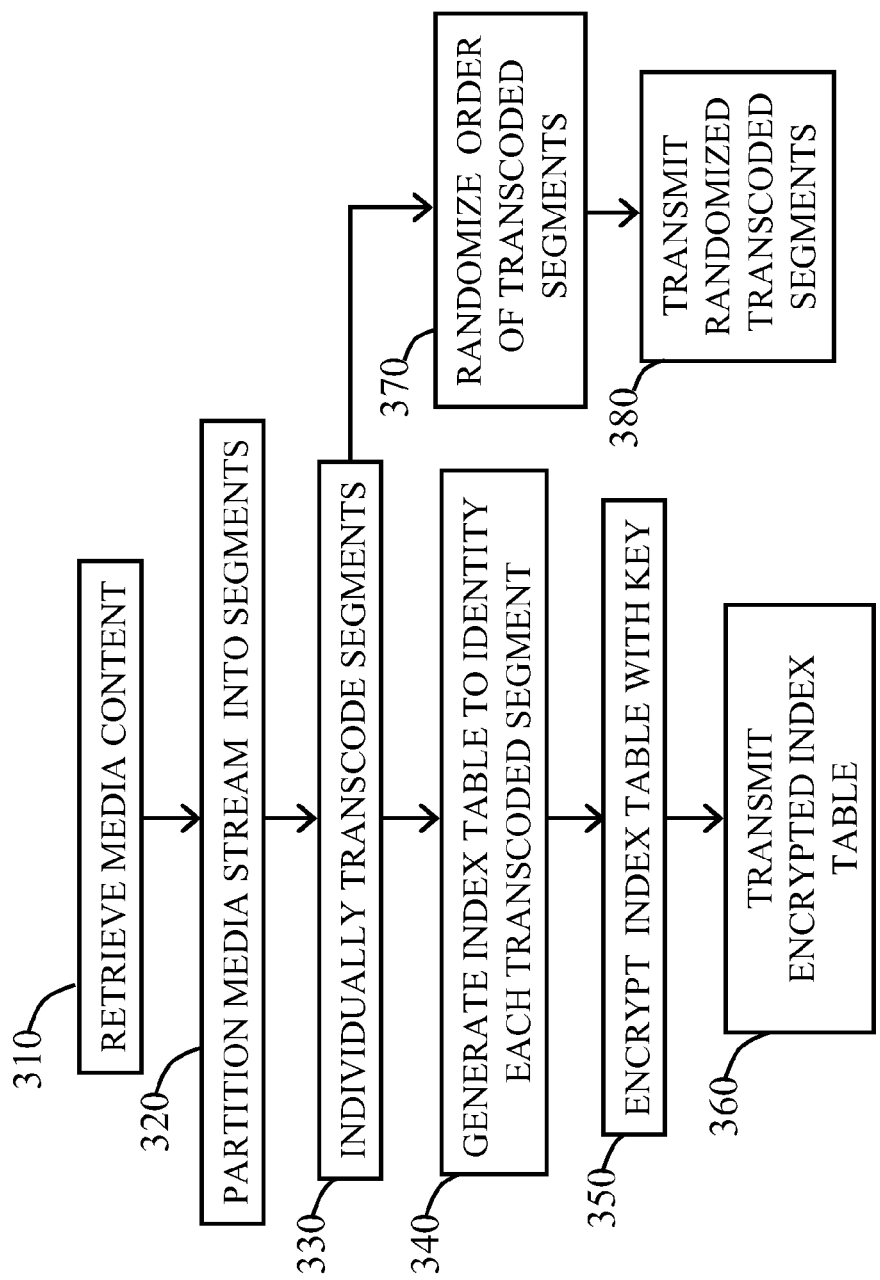

FIG. 3, which includes FIGS. 3A-3D, illustrates operations at a media server in accordance with an embodiment of the invention, wherein FIG. 3A illustrates a operational flow diagram, wherein FIGS. 3B-3D illustrate a media stream during the processing.

Referring to FIG. 3, media content is retrieved (step 310). The media content may be stored locally or over a network. The media content may be retrieved when a user initiates a session and requests streaming of the media.

Next, the retrieved media is partitioned (step 320). In one embodiment, the media stream is partitioned into a plurality of media segments. For example, media segments of about 0.5 s to about 5 s may be generated from the media stream. As an example, FIG. 3B illustrates a first media stream 301 segmented into a plurality of media segments $M_1$, $M_2$, $M_3$, ..., $M_i$, ..., $M_n$). In one embodiment, all the media segments have a same time length (duration). In alternative embodiments, the media segments may comprise different time lengths.

In an alternative embodiment, the audio and video portions of the media stream are separated into independent audio and video streams. The audio stream is segmented into separate audio segments. Similarly, the video stream is segmented into distinct video segments. In one embodiment, the audio segments and the video segments have different time lengths.

Each of the individual media segments (or audio segments and video segments) are transcoded to form transcoded media segments (step 330). During this step, transcoding algorithms that are optimized for the given media type and the client device are applied on each segment. Therefore, there is no loss in efficiency of the encoding, compression processes etc.

Next, as shown in step 340, an index table is generated to identify the location of each media segment in the media stream. If separate audio and video segments have been generated, the index table also includes additional information to synchronize the audio and the video segments. The index table may also be generated before or during the transcoding of the media segments in various embodiments.

Next, the index table is encrypted using an encryption algorithm, for example, using a key (step 350). The key may be known to the client device or may be transmitted to the client device through a secure channel. The encrypted index table is transmitted to the client device (step 360).

The sequence of the transcoded media segments is randomized (step 370). During this step, the media segments are placed in random order. As an example, FIG. 3C illustrates a second media stream 302 after randomization of the first media stream 301 in FIG. 3B. Consequently, unauthorized user receiving the randomized media stream can not decipher the content of the media.

Further, in some embodiments, additional media may be included between the media segments. For example, advertisements may be introduced between the media segments. As an example, FIG. 3D illustrates a third media stream 303 including additional media segments ($A_1$, $A_2$ etc). The third media stream 303 has been generated by placing the additional media segments within the second media stream 302 of FIG. 3B.

The randomized transcoded segments are transmitted to the media device (step 380). In various embodiments, the actual sequence of the transcoding may be different. In some embodiments, the transcoding may be performed after randomizing the sequence of the media segments (i.e. after step 370). This is because each segment retains all the characteristics of the original media stream.

Figure 4A:
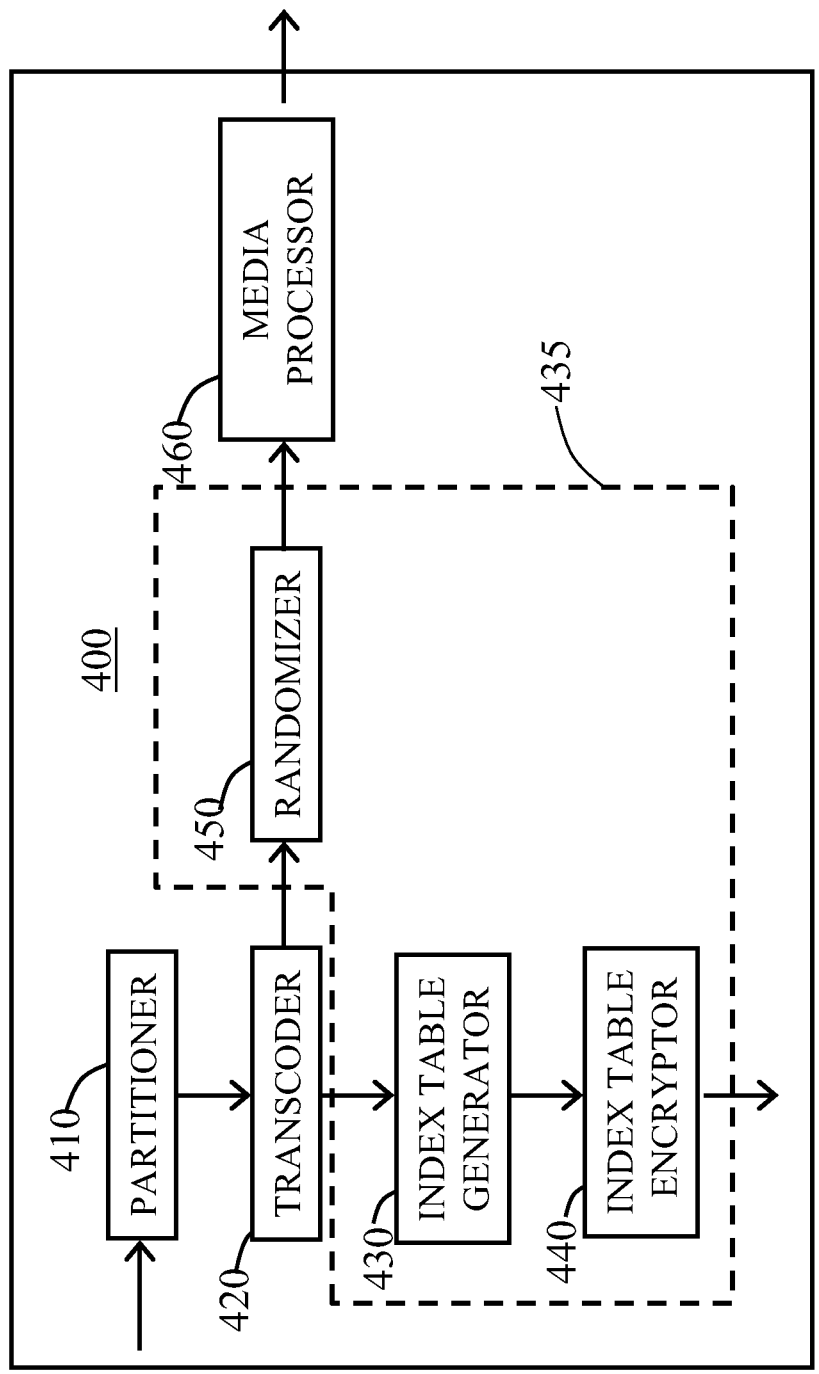
FIGS. 4A and 4B, illustrates the components within a media server implementing embodiments of the invention.
Figure 4B:
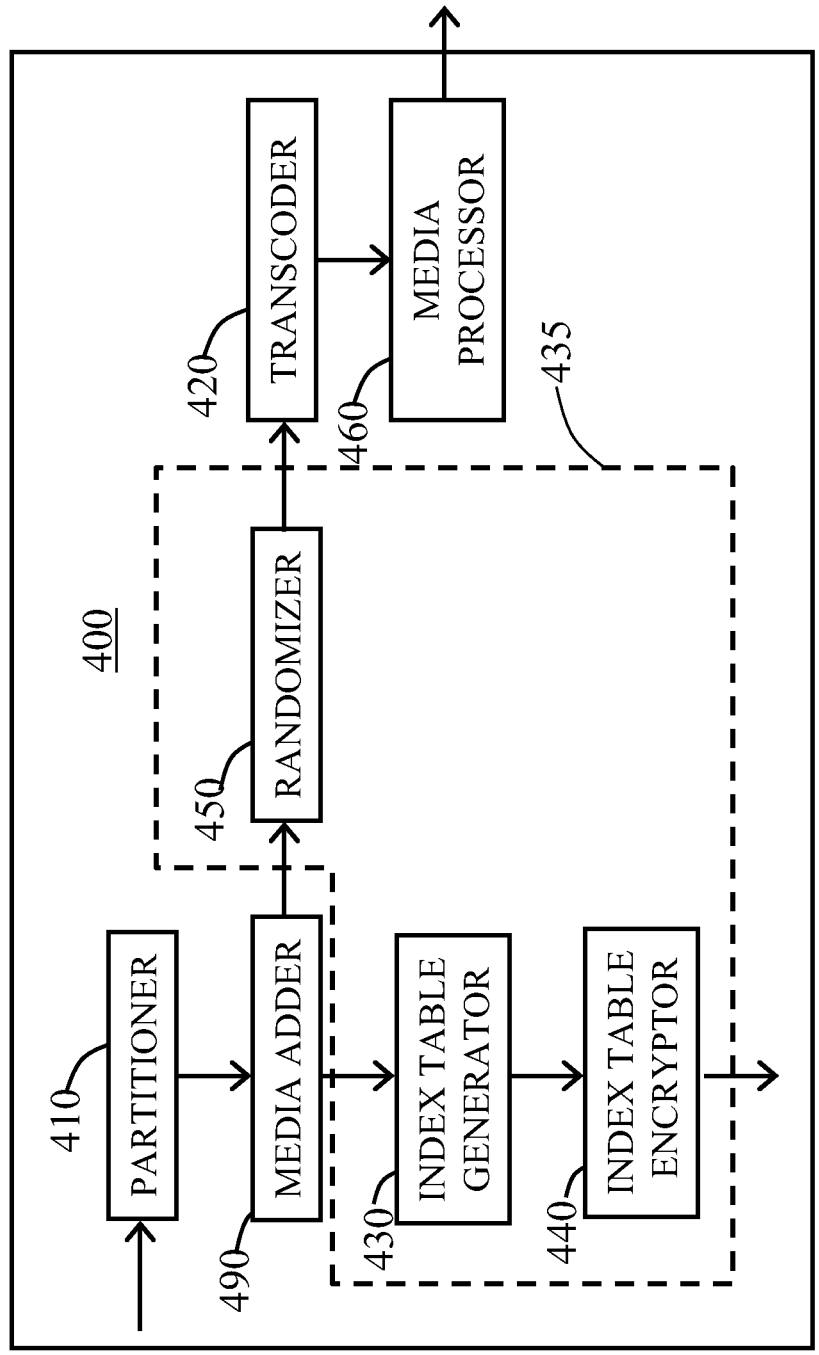

FIG. 4, which includes FIGS. 4A and 4B, illustrates the components within the media server implementing embodiments of the invention.

Referring to FIG. 4A, the media server 400 comprises a partitioner 410 for forming media segments. The partitioner 410 may also separate the audio stream from the video stream before or after segmenting the media stream. The output of the paritioner 410 is coupled to a transcoder 420, which transcodes the segmented media stream. The outputs of the transcoder 420 are coupled to an encryptor 435, which includes an index table generator 430, an index table encryptor 440, and a randomizer 450. The index table generator 430 generates an index table to identify the location of each of the audio segments and the video segments in the media stream. The index table encryptor 440 applies an encryption algorithm on the generated index table. The randomizer 450 randomizes the order of the media segments within the media stream. The output from the encryptor 435 may be an input to a media processor 460 for media processing (if required).

FIG. 4B illustrates an alternative embodiment further comprising a media adder.

As in the prior embodiment as described with respect to FIG. 4A, FIG. 4B includes the partitioner 410, the transcoder 420, the index table generator 430, the index table encryptor 440, the randomizer 450, and the media processor 460. FIG. 4B differs from FIG. 4A in at least two aspects. As an illustration, the transcoder 420 is coupled to the output of the randomizer 450. Because the media segments outputted from the randomizer 450 are compliant with a media compression standard, transcoding operations can be directly performed on the randomized media stream. FIG. 4B also includes a media adder 490, which is used to insert additional media into the media stream. For example, in various embodiments, advertizing information and/or service information may included into the media stream. The location of the additional media in the media stream is stored within the index table. Therefore, a client device receiving the media stream with the additional media can use the index table and remove the additional media while playing. However, unauthorized client devices can not remove the additional media and are forced to display it.

Figure 5:
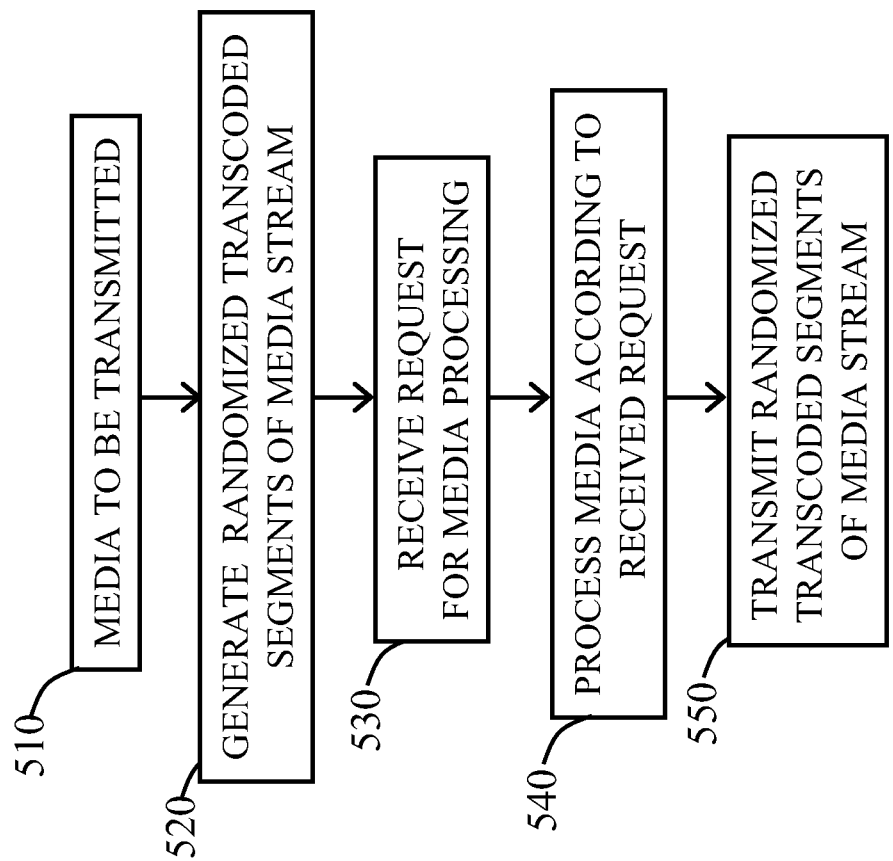
FIG. 5 illustrates operations at a media server under adaptive streaming in accordance with embodiments of the invention.

FIG. 5 illustrates operations at a media server undergoing adaptive streaming in accordance with embodiments of the invention.

As illustrated in FIG. 5, media to be transmitted is retrieved, and a randomized transcoded media stream is generated as described above in various embodiments (steps 510 and 520). The media server may begin transmission of the randomized and transcoded media segments to the media device (e.g., step 550).

During the on-going session, the media device may request a media operation (step 530). When the media server receives a request for media processing, the media server performs the media operation directly on the randomized and transcoded data without a separate decryption step (step 540). Direct media processing on the randomized media stream is possible because the randomized media stream is compliant with compressed media codec standards, such as MPEG-2, H.264 etc. This allows the media server to efficiently perform the operation without incurring significant additional computational overhead due to the media operation. The media server continues transmitting the media stream after the media processing (step 550).

Figure 6:
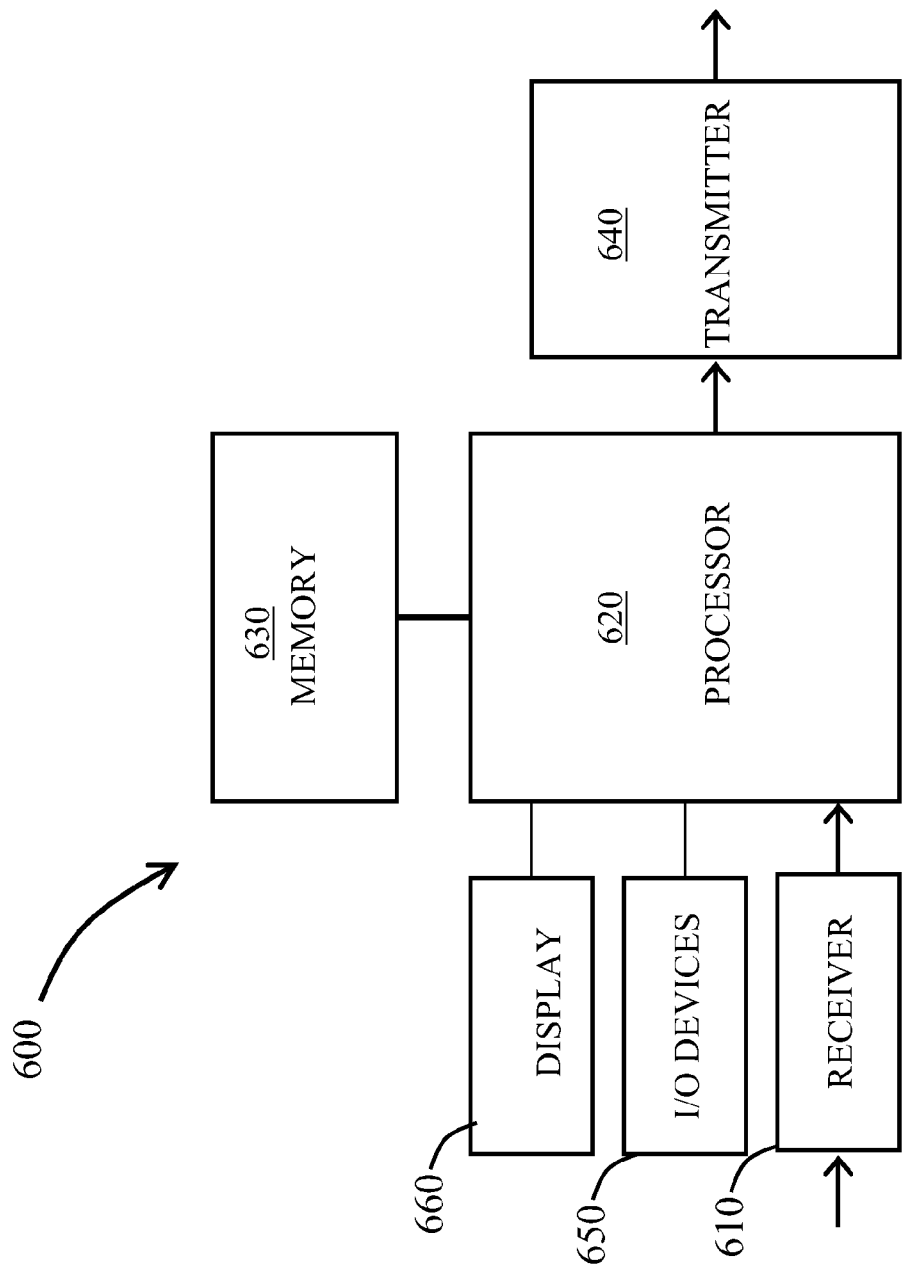
FIG. 6 illustrates a representative media server in accordance with embodiments of the invention.

FIG. 6 illustrates a representative media server in accordance with embodiments of the invention.

The media server 600 includes a receiver 610, which may include a wireless antenna receiver and/or a wired network connection port for receiving the media content, for example, if it is stored at a remote location. The media server 600 also includes a memory 630, which may include both a non-volatile memory and a volatile memory. In one embodiment, instructions for performing the operations as described in FIG. 3 and/or FIG. 5 may be stored in a non-transitory storage medium such as a magnetic storage medium or a solid state storage medium in the memory 630.

The media server 600 may include further I/O devices 650 for inputting and outputting data. For example, the I/O devices 650 may include an optical disc such as a laser readable medium, for example, a compact disc reader, a blue ray disk reader, and/or digital video reader etc. In one or more embodiments, the instructions for performing the operations as described in FIG. 3 and/or FIG. 5 may be stored in an optical disc, which is a non-transitory storage medium.

The media server 600 may also include a display 660 and a transmitter 640 for transmitting the randomized transcoded data. The transmitter 640 may include a plurality of wireless antennas and/or a wired port(s). The transmitter 640 and the receiver 610 can be combined together in some embodiments.

The media server 600 includes a processor 620 configured to execute the instructions for performing the operations as described in FIG. 3 and/or FIG. 5. The processor 620 may comprise a single processor or a plurality of processors.

In one embodiment, the processor 620 comprises the partitioner 410, the transcoder 420, the index table generator 430, the index table encryptor 440, the randomizer 450, the optional media adder 490, and the media processor 460 as described with respect to FIG. 4. In another embodiment, the processor 620 comprises a plurality of separate chips performing one or more of the functions of the partitioner 410, the transcoder 420, the index table generator 430, the index table encryptor 440, the randomizer 450, the optional media adder 490, and the media processor 460.

In an alternative embodiment, the functions of the partitioner 410, the transcoder 420, the index table generator 430, the index table encryptor 440, the randomizer 450, the optional media adder 490, and the media processor 460 may be performed within the same processor at different times. In other words, the processor 620 behaves as the partitioner 410, the transcoder 420, the index table generator 430, the index table encryptor 440, the randomizer 450, the optional media adder 490, and the media processor 460 at various stages of the media processing.

Figure 7:
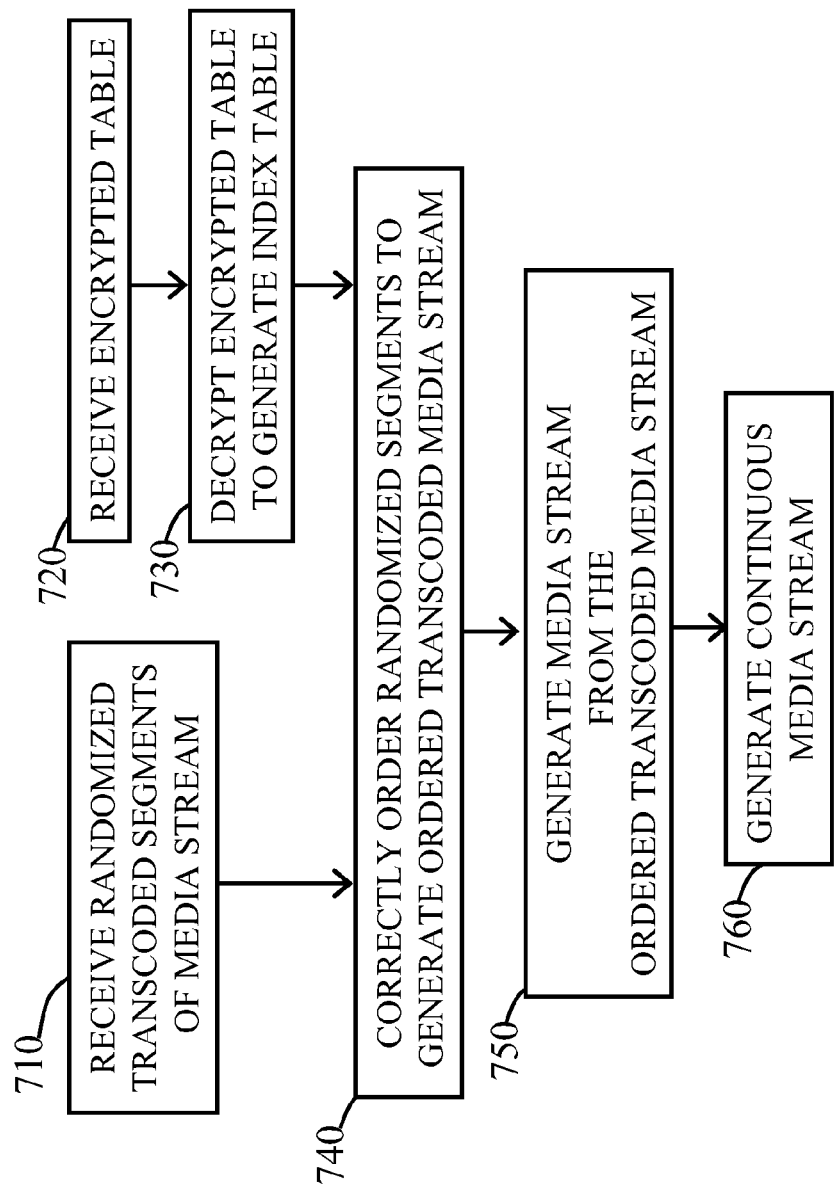
FIG. 7 illustrates operations at a media device in accordance with an embodiment of the invention.

FIG. 7 illustrates operations at a media device in accordance with an embodiment of the invention.

The media device receives the randomized transcoded media stream from a media server (step 710). The media device also receives the encrypted index table (step 720). The media stream may have been transmitted through wired communication channels and/or a wireless communication channel.

The media device decrypts the encrypted table to generate an index table that has information to obtain the original sequence of the media segments before partitioning in the media server. The media device may use a key that is identical to the key used at the media server to encrypt the index table. The key may have been agreed upon previously between the media device and the media server, or the key may have been separately transferred to the media device through a secure channel.

Using the index table, the randomized transcoded segments are ordered to match the sequence of the segments in the original media stream at the media server before randomization (step 740). If the audio and video were separately randomized, the index table includes information to synchronize the audio and the vide segments.

The media stream is generated from the ordered transcoded media stream segments (step 750). Each of the transcoded segments may be decoded and decompressed to generate media segments. The media segments are then de-segmented to generate a continuous media stream (step 760).

Figure 8:
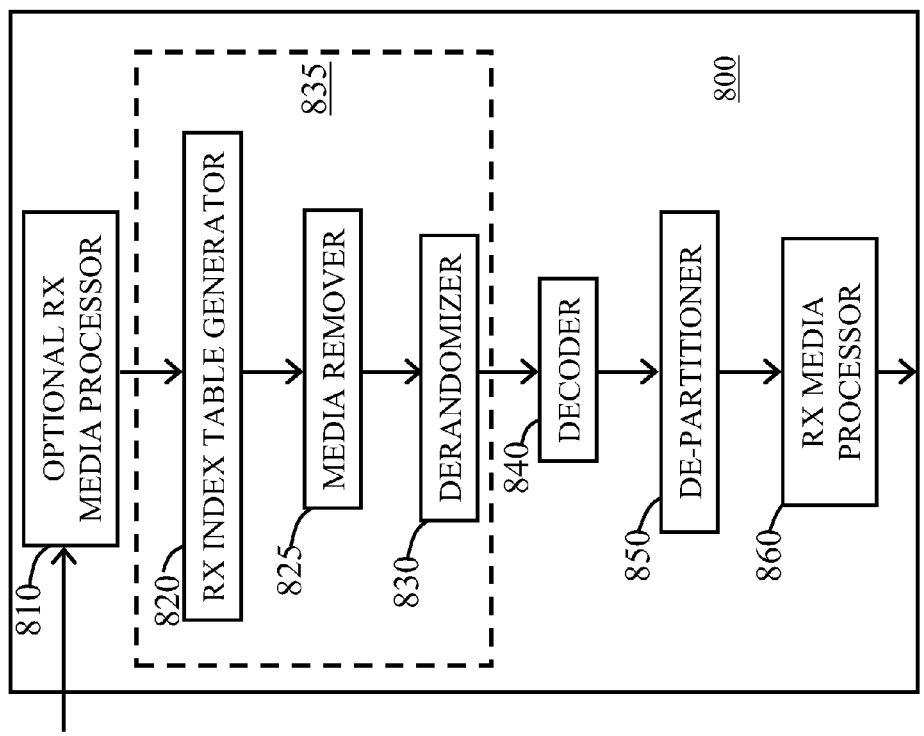
FIG. 8 illustrates the components within a media device implementing embodiments of the invention.

FIG. 8 illustrates the components within the media device implementing embodiments of the invention.

The media device may be a networked computer, standalone computer, laptop, netbooks, hand held device including cell phones, smart phone, and other user devices used in media processing. The media device 800 comprises an optional Rx media processor 810 which is configured to execute instructions to perform media processing on the randomized media stream. Advantageously, because the randomized media stream received at the media device 800 is compliant with media format, the optional Rx media processor 810 can directly manipulate the randomized media stream without any further decryption.

The randomized transcoded media stream is input into a decryptor 835, which includes a Rx index table generator 820, an optional media remover 825, and a derandomizer 830. The Rx index table generator 820 generates an index table that includes the location information of each media segment within the received media stream. The media remover 825 is optional and may be required if additional media such as advertisement and/or service information is added into the media stream (see e.g., FIG. 4B). The media remover 825 uses the index table to locate the position of the additional media and removes them from the media stream. The derandomizer 830 uses the index table from the Rx index table generator 820 to regenerate the correct sequence of the media segments. Decoding and decompression may be performed in a decoder 840. In some embodiments, the operations at the decoder 840 may be performed before the derandomizer 830 regenerates the correct sequence of the media segments. The decoded media segments are desegmented to form a continuous media stream in the de-partitioner 850. The media stream from the de-partitioner 850 may be further processed, for example, in a Rx media processor 860 for media processing operations, which may include displaying the output.

Figure 9:
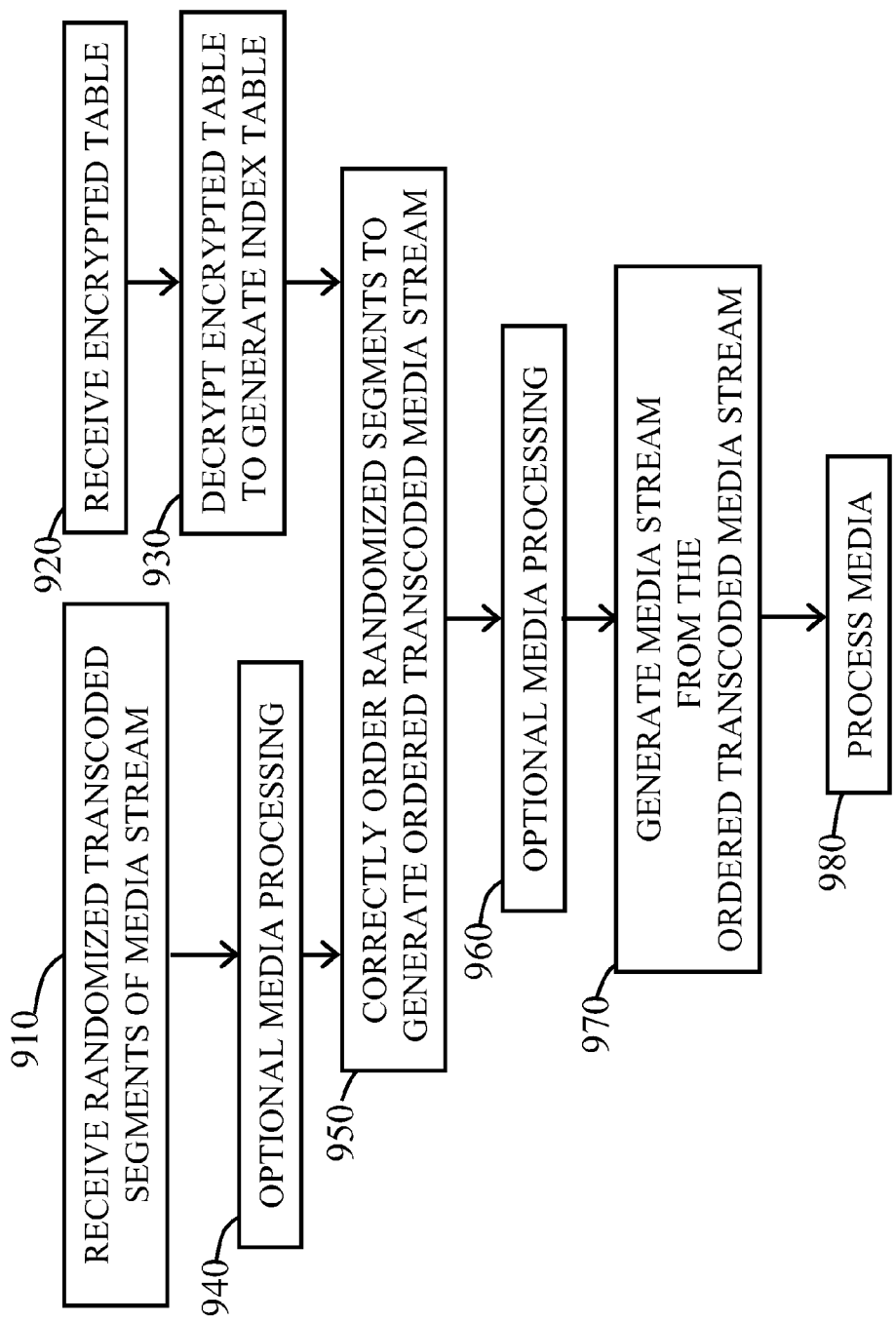
FIG. 9 illustrates operations at a media device undergoing adaptive streaming in accordance with embodiments of the invention.

FIG. 9 illustrates operations at a media device undergoing adaptive streaming in accordance with embodiments of the invention.

Similar to FIG. 7, the operations illustrates receiving a randomized transcoded media stream and generating a media stream having the correct sequence using an index table received from the media server (steps 910, 920, 930, and 950). A continuous media stream, which may be processed, is generated as in the prior embodiment described in FIG. 7 (steps 970 and 980). However, unlike FIG. 7, FIG. 9 includes additional steps of performing optional media processing (steps 940 and 960). In various embodiments, the media processing may be performed directly on the media stream at either position in the operational flow because both the randomized media stream (media stream after step 910) and subsequently the ordered media stream (media stream after step 950) is compliant with compressed media codec standards, such as MPEG-2, H.264 etc.

Figure 10:
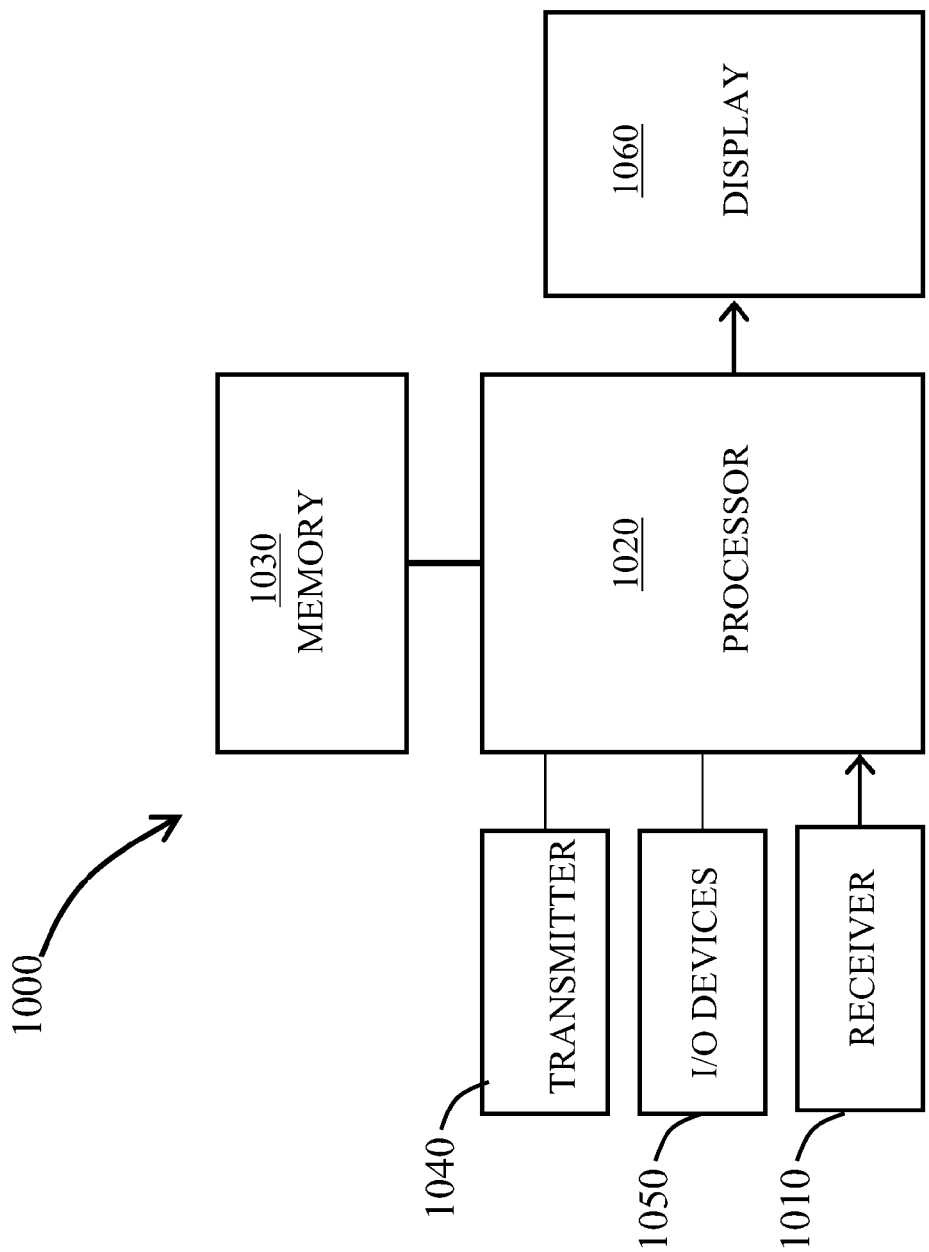
FIG. 10 illustrates a representative media device in accordance with embodiments of the invention.

FIG. 10 illustrates a representative media device in accordance with embodiments of the invention.

The media device 1000 includes a receiver 1010, which may include a wireless antenna receiver and/or a wired network connection port for receiving the encrypted media stream. The media device 1000 also includes a memory 1030, which may include both a non-volatile memory and a volatile memory. In one embodiment, instructions for performing the operations as described in FIG. 7 and/or FIG. 9 may be stored in a non-transitory storage medium (e.g., hard drive) such as a magnetic storage medium or a solid state storage medium in the memory 1030.

The media device 1000 may include further I/O devices 1050 for inputting and outputting data. For example, the I/O devices 1050 may include an optical disc such as a laser readable medium, for example, a compact disc reader, a blue ray disc reader, and/or digital video reader etc. In one or more embodiments, the instructions for performing the operations as described in FIG. 7 and/or FIG. 9 may be stored in an optical disc, which is a non-transitory storage medium. The I/O devices 1050 may be internal or external devices.

The media device 1000 may also include a display 1060 for displaying the media stream after decryption and decompression. The media device may also comprise a transmitter 1040 for communicating with the media server. The transmitter 1040 may include a wireless antenna and/or a wired port.

The media device 1000 includes a processor 1020 configured to execute the instructions for performing the operations as described in FIG. 7 and/or FIG. 9. The processor 1020 may comprise a single processor or a plurality of processors.

In one embodiment, the processor 1020 comprises the optional Rx media processor 810, the Rx index table generator 820, the media remover 825, the derandomizer 830, the decoder 840, the de-partitioner 850, and the Rx media processor 860 as described with respect to FIG. 8. In another embodiment, the processor 1020 comprises a plurality of separate chips performing one or more of the functions of the optional Rx media processor 810, the Rx index table generator 820, the media remover 825, the derandomizer 830, the decoder 840, the de-partitioner 850, and the Rx media processor 860.

In an alternative embodiment, the functions of the optional Rx media processor 810, the Rx index table generator 820, the media remover 825, the derandomizer 830, the decoder 840, the de-partitioner 850, and the Rx media processor 860 may be performed within the same processor at different times. In other words, the processor 1020 behaves as the optional Rx media processor 810, the Rx index table generator 820, the media remover 825, the derandomizer 830, the decoder 840, the de-partitioner 850, and the Rx media processor 860 at various stages of the media processing.

The above described embodiments of a media server (e.g., FIG. 4) and the media device (e.g., FIG. 6) (as well as the methods described above with respect to FIGS. 3A, 5, 7, and 9) may also be illustrated in terms of methods comprising functional steps and/or non-functional acts. The aforementioned description and related flow diagrams illustrate steps and/or acts used in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of "steps for" and/or "acts of" in the recitation of the claims—and in the following description of the flow diagrams(s) for FIGS. 3A, 5, 7, and 9—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of streaming media, the method comprising:
at a media server, partitioning a media stream into a first stream of media segments;
transcoding individual media segments in the first stream of media segments to obtain a first stream of transcoded media segments, the first stream of transcoded media segments having a first sequence;
generating an index table identifying the first sequence;
encrypting the index table using a key;
randomizing the first stream of transcoded media segments by placing transcoded media segments of the first stream of transcoded media segments in a random order to obtain a second stream of transcoded media segments, the second stream of transcoded media segments having a second sequence, the second sequence being random relative to the first sequence; and
transmitting the encrypted index table and the second stream of transcoded media segments.

2. The method of claim 1, wherein all media segments in the first stream of media segments have a common duration.

3. The method of claim 1, wherein the first stream of media segments comprise audio segments and video segments, and wherein the audio segments have a different duration from the video segments.

4. The method of claim 1, further comprising:
introducing extra media segments into the second stream of transcoded media segments prior to transmitting the second stream of transcoded media segments.

5. The method of claim 4, wherein the extra media segments comprise an advertisement.

6. The method of claim 1, wherein the second stream of transcoded media segments is compliant with a media compression standard.

7. A media server comprising:
a partitioner configured to partition a media stream to be transmitted into a first stream of media segments;
a transcoder comprising a processor coupled to a non-transitory computer readable medium, the transcoder configured to transcode individual media segments in the first stream of media segments to obtain a first stream of transcoded media segments, the first stream of transcoded media segments having a first sequence;
an index table generator configured to generate an index table identifying the first sequence;
an index table encryptor configured to encrypt the index table using a key;
a randomizer configured to randomize the first stream of transcoded media segments by placing transcoded media segments of the first stream of transcoded media segments in a random order, thereby obtaining a second stream of transcoded media segments having a second sequence, the second sequence being random relative to the first sequence; and
a transmitter configured to transmit the encrypted index table and the second stream of transcoded media segments.

8. The media server of claim 7, wherein the partitioner is further configured to partition the media stream into audio segments and video segments.

9. The media server of claim 8, wherein the audio segments have a different duration than the video segments.

10. The media server of claim 7, further comprising:
a media adder configured to introduce extra media segments into the second stream of transcoded media segments.

11. The media server of claim 10, wherein the extra media segments comprise an advertisement.

12. The media server of claim 7, wherein the second stream of transcoded media segments is compliant with a media compression standard.

13. A media device comprising:
a receiver comprising a processor coupled to a non-transitory computer readable medium, the receiver configured to receive a first stream of transcoded media segments, wherein the first stream of transcoded media segments are compliant with a media compression standard, and wherein the receiver is further configured to receive an encrypted index table;
an index table generator configured to generate an index table by decrypting the encrypted index table, the index table having sequence information; and
a derandomizer configured to reorder the first stream of transcoded media segments in accordance with the sequence information by placing media segments in the first stream of media segments in a random order to obtain a second stream of transcoded media segments, the second stream of transcoded media segments having an ordering of media segments that is random with respect to that of the first stream of media segments.

14. The media device of claim 13, further comprising:
a decoder configured to decode the second stream of transcoded media segments to generate media stream segments; and
a de-partitioner configured to generate a media stream by combining the media stream segments.

15. The media device of claim 13, further comprising a media processor configured to perform media operations on the first stream of transcoded media segments without decryption.

16. The media device of claim 13, further comprising a media remover configured to remove extra media segments added between transcoded media segments in the first stream of transcoded media segments.

17. A computer program product comprising a non-transitory computer readable storage medium storing programming, the programming including instructions to:
partition a media stream into a first stream of media segments;
transcode individual media segments in the first stream of media segments to obtain a first stream of transcoded media segments, the first stream of transcoded media segments having a first sequence;
generate an index table identifying the first sequence;
encrypt the index table using a key to obtain an encrypted index table;
randomize the first stream of transcoded media segments to obtain a second stream of transcoded media segments, the second stream of transcoded media segments having a second sequence that is random relative to the first sequence; and
transmit the encrypted index table and the second stream of transcoded media segments.

18. The computer program product of claim 17, wherein all media segments in the first stream of media segments have a common duration.

19. The computer program product of claim 17, wherein the first stream of media segments comprise audio segments and video segments.

20. The computer program product of claim 19, wherein the audio segments have a different duration than the video segments.

21. The computer program product of claim 17, wherein the programming further includes instructions to:
    introduce extra media segments into the second stream of the transcoded media segments prior to transmitting the second stream of transcoded media segments.

22. The computer program product of claim 17, wherein the extra media segments comprise an advertisement.

23. The computer program product of claim 17, wherein the second stream of transcoded media segments is compliant with a media compression standard.

* * * * *